UNITED STATES PATENT OFFICE.

CHARLES POLLAK, OF FRANKFORT-ON-THE-MAIN, GERMANY.

FORMING ACCUMULATORS.

SPECIFICATION forming part of Letters Patent No. 628,676, dated July 11, 1899.

Application filed March 14, 1898. Serial No. 673,863. (No specimens.)

*To all whom it may concern:*

Be it known that I, CHARLES POLLAK, a subject of the Emperor of Austria-Hungary, and a resident of Frankfort-on-the-Main, Germany, have invented certain new and useful Improvements in Forming Accumulators, of which the following is a specification.

It has hitherto been assumed that in the electrolysis of solutions containing lead or of any electrolyte placed between lead plates lead peroxid is invariably obtained at the anode. I have ascertained, however, that under certain conditions the result may be lead at lower stages or degrees of oxidation, while at the same time its salts may form in the electrolytical process, provided a predetermined "critical" voltage consistent with the nature of the compounds alluded to is not exceeded. In the case of lead electrodes at one volt constant electromotive force the resulting products will be suboxids of lead of a gray color and other lead salts poor in oxygen. At from 1.5 to 1.8 volts there will be obtained orange-red lead oxids very nearly approaching red lead, while at an electromotive force of over two volts the well-known peroxid of lead will form. In order to attain these results, the electromotive force of the electrolytical cell should in no case exceed what in regard to the given body may be described as the "critical" point. Thus where the amount of current is exceptionally slight, for example, a layer of lead sulfate may be obtained in dilute sulfuric acid upon the lead anode; but where it is proposed to operate with comparatively large amounts of current care should be taken to see that the source of current exhibits precisely the requisite voltage, or that such voltage is secured by the interposition of counter electromotive force in the form, say, of accumulators. The internal resistance of the cells thus interposed and of the source of current and conductors should be as low as possible, so as not to influence the amount of current in an appreciable degree. Where more electromotive force is available, a number of electrolytical cells may be connected in series, care being taken that all the cells being formed are as nearly as practicable alike, failing which totally different products might be obtained in the several cells.

Let it be assumed, for example, that in a number of cells with lead electrodes the surface or area of the anodes is considerably less than in the remaining cells. The consequence will be that on these smaller anodes lead peroxid will form instead of lead at the desired lower grades of oxidation, and similar alterations must be occasioned by other variations—such, for example, as in temperature, density of the electrolyte, and the like. In lead plates of the Planté formation the difficulty has invariably been observed that in a short time the positive plates become covered with a thin though dense film of peroxid of lead whereby the electrolytic action is less effective, owing to the difficulty of penetrating the plates, so that it takes a very long period to complete the electrode formation by that method. It was necessary also to reverse the current at frequent intervals—that is to say, to effect a series of oxidations and reductions in order to obtain a sufficiently deep layer of peroxid upon the plate.

By my process electrode-plates to be formed can in a very short time be covered with a deep layer of oxid by the electrolytical process. According to this process the cells should be connected to a source of current of a maximum electromotive force of two volts. One storage-cell will therefore prove a sufficient source of electricity for two such cells connected in series. The cells are subjected to the action of current for a greater or less time, according as a thin or thick layer of oxid is to be obtained on the plate. After the lapse of the time allowed the plates will be found to be covered with a perfectly firm and cohesive, though porous, layer of oxid of lead. To accelerate the action, it is advisable to raise the temperature of the cell being formed to about 40° centigrade. This mode of treatment of the plates is not, however, to be regarded as formation proper, but as a preparatory operation or the initial stage of the formation process. The plates covered with lead oxid by this method may now be converted into either positive or negative accumulator-plates by further electrolytical treatment by any well-known process. To enable the plates to be formed, the plates should either be peroxidized directly or first reduced—as in the case of the negative plates—and then peroxidized. In this process of treatment the whole of the preparatory layer of oxid becomes converted into peroxid in a concrete form, so that excellent positive electrodes are obtained as a result. This process is an outcome of the observation that in electrolytical cells the nature of the chemical compounds depends upon the voltage of the electromotive force, while the quantity of chemicals produced in the course of the operation in accordance with the well-known law continues proportional to the amount of current. A further feature of this process is that in its performance the lead oxid is not precipitated upon the electrodes from lead salts, but by the oxidation of the metal of the electrode itself, it being immaterial what other electrolyte is used.

I claim—

The herein-described process of forming lead electrodes in accumulators, consisting in first treating them as anodes in electrolytical elements with a current having a tension which does not exceed two volts per element, thereby producing a covering of lower oxid of lead, and then completing the formation by the use of a current having an electromotive force in excess of two volts.

In testimony whereof I have signed my name to this specification in the presence of two subscribing witnesses.

CHARLES POLLAK.

Witnesses:
JEAN GRUND,
FRANK H. MASON.